(12) United States Patent
Yoshida et al.

(10) Patent No.: US 11,732,933 B2
(45) Date of Patent: Aug. 22, 2023

(54) MAGNETIC COOLING DEVICE

(71) Applicant: Panasonic Intellectual Property Management Co., Ltd., Osaka (JP)

(72) Inventors: Hiroaki Yoshida, Osaka (JP); Kazuki Sakai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 333 days.

(21) Appl. No.: 17/185,851

(22) Filed: Feb. 25, 2021

(65) Prior Publication Data

US 2021/0285696 A1 Sep. 16, 2021

(30) Foreign Application Priority Data

Mar. 16, 2020 (JP) ................... 2020-045520

(51) Int. Cl.
*F25B 21/00* (2006.01)
(52) U.S. Cl.
CPC ...... *F25B 21/00* (2013.01); *F25B 2321/0023* (2013.01)
(58) Field of Classification Search
CPC ... F25B 21/00; F25B 2321/0023; Y02B 30/00
See application file for complete search history.

(56) References Cited

U.S. PATENT DOCUMENTS

| 2009/0217674 A1 | 9/2009 | Kaji et al. |
| 2012/0031107 A1 | 2/2012 | Heitzler et al. |
| 2020/0292213 A1* | 9/2020 | Scharf ................ F25B 21/00 |

FOREIGN PATENT DOCUMENTS

| JP | 2009-204234 | 9/2009 | |
| JP | 2010-151407 | 7/2010 | |
| JP | 2013-533456 | 8/2013 | |
| JP | 2019-509461 | 4/2019 | |
| KR | 20160081657 A | * 7/2016 | ............ C09K 5/14 |
| WO | 2017/162768 | 9/2017 | |

* cited by examiner

*Primary Examiner* — Ana M Vazquez
(74) *Attorney, Agent, or Firm* — Wenderoth, Lind & Ponack, L.L.P.

(57) ABSTRACT

Provided is a magnetic cooling device including: in a hollow container, an inert gas; a material filling part containing a refrigerant and magnetic material particles having a magnetocaloric effect; gas storages containing the refrigerant at both ends of the material filling part; and material partitions between the material filling part and the gas storages, in which a volume proportion of the inert gas in the hollow container is 1 vol % or more and 12 vol % or less.

10 Claims, 2 Drawing Sheets

MAGNETIC COOLING DEVICE

BACKGROUND

1. Technical Field

The present disclosure relates to a magnetic cooling device used in a magnetic cooling apparatus.

2. Description of the Related Art

Currently, a gas cooling method is mainly used as a cooling method, but due to the Kigali Amendment of the Montreal Protocol in 2016, regulations on chlorofluorocarbons used as refrigerants for a gas cooling method and alternative chlorofluorocarbons are being tightened because they promote global warming. Therefore, a magnetic cooling method that does not use chlorofluorocarbons or alternative chlorofluorocarbons has been proposed.

The magnetic cooling method uses a magnetocaloric effect that a magnetic material generates heat when a magnetic field is applied to the magnetic material. Thus, it is necessary to change the magnetic order of the magnetic material by a magnetic field in an adiabatic state, and to exchange heat with the refrigerant for a thermal energy accompanying a change in magnetic entropy at that time. Therefore, a magnetic cooling apparatus used in the magnetic cooling method is provided with a magnetic cooling device in which a hollow container such as a cylinder is filled with a magnetic material having a magnetocaloric effect in a shape that allows a refrigerant to flow inside the hollow container. The magnetic cooling device is cooled by a magnetic cooling cycle in which a magnetic field is applied/unloaded and a refrigerant is transported alternately and continuously. The magnetic cooling apparatus uses a magnetic material which is a solid refrigerant and a refrigerant such as water for heat exchange with the magnetic material as the refrigerant, and does not require an environmentally hazardous substance such as alternative chlorofluorocarbons. In addition, since the gas cooling method undergoes a process with high irreversibility in a series of cooling cycles, the actual cooling efficiency is smaller than the theoretical efficiency. However, the magnetic cooling method does not require a process with high irreversibility, so that it is attracting attention from the viewpoint of improving the efficiency of cooling capacity.

As an existing disclosure for realizing high cooling efficiency in the magnetic cooling method, there is a magnetic cooling apparatus as shown in Japanese Patent Unexamined Publication No. 2010-151407. Japanese Patent Unexamined Publication No. 2010-151407 discloses a method of reducing input power in a magnetic cooling apparatus by mechanically connecting a magnetic modulator and a refrigerant transport device constituting the magnetic cooling apparatus to reduce the number of power sources, and of improving the cooling efficiency, which is a proportion of the cooling output to the input power.

SUMMARY

According to an aspect of the present disclosure, there is provided a magnetic cooling device including: in a hollow container, an inert gas;

a material filling part containing a refrigerant and magnetic material particles having a magnetocaloric effect;

gas storages containing the refrigerant at both ends of the material filling part; and material partitions between the material filling part and the gas storages, in which a volume proportion of the inert gas in the hollow container is 1 vol % or more and 12 vol % or less.

According to another aspect of the present disclosure, there is provided a magnetic cooling method using a magnetic cooling apparatus provided with a magnetic cooling device including: in a hollow container, an inert gas;

a material filling part containing a refrigerant and magnetic material particles having a magnetocaloric effect;

gas storages containing the refrigerant at both ends of the material filling part; and material partitions between the material filling part and the gas storages, in which a particle size d ($\mu$m) of the magnetic material particles is 100 $\mu$m or more and 3000 $\mu$m or less, a flow velocity v (mm/s) in a magnetic cooling cycle of the refrigerant is 20 mm/s or more and 80 mm/s or less, a volume proportion x (vol %) of the inert gas in the hollow container is 1 vol % or more and 12 vol % or less, and the following expression (1) is satisfied:

$$x \leq 2.1 v^2/d \text{ and } 1 \leq x \leq 12 \tag{1}.$$

DETAILED DESCRIPTION

The inventors of the present application noticed that there are still problems to be overcome with the existing magnetic cooling device, and found the necessity to take measures for that. Specifically, the inventors of the present application found that there are the following problems.

In the magnetic cooling apparatus having the above configuration, the heat exchange property between the magnetic material particles and the refrigerant is low because there is a wake region in gaps filled with the magnetic material particles, which is a region in which the momentum exchange of the refrigerant is not actively performed. Therefore, in the magnetic cooling apparatus, a temperature difference is formed by exchanging heat generation and heat absorption of the magnetic material with the refrigerant, so that there is a problem that the cooling capacity is small if the heat exchange property between the magnetic material particles and the refrigerant is low.

The present disclosure focuses on the improvement of the cooling capacity of the magnetic cooling device used in the magnetic cooling apparatus, and an object thereof is to provide a novel magnetic cooling device with improved heat exchange property between magnetic material particles and a refrigerant and improved cooling capacity due to the magnetocaloric effect.

An exemplary embodiment of the present disclosure for solving the above problems is as follows.

Item 1

A magnetic cooling device including: in a hollow container,
an inert gas;
a material filling part containing a refrigerant and magnetic material particles having a magnetocaloric effect;
gas storages containing the refrigerant at both ends of the material filling part; and
material partitions between the material filling part and the gas storages,
in which a volume proportion of the inert gas in the hollow container is 1 vol % or more and 12 vol % or less.

Item 2

The magnetic cooling device of Item 1, in which a particle size of the magnetic material particles is 100 μm or more and 3000 μm or less.

Item 3

The magnetic cooling device of Item 1 or 2, in which the magnetic material particles are at least one selected from the group consisting of $Gd_{1-a}M_a$ [in the formula, M is at least one element selected from the group consisting of Y, La, Ce, Pr, Nd, Sm, Eu, Tb, Dy, Ho, and Er, and $0 \leq a \leq 0.5$]; and $(La_{1-b}Re_b)(Fe_{1-c-d}TM_cSi_d)_{13}H_e$ [in the formula, Re is at least one rare earth element selected from the group consisting of Ce, Pr, Nd, Pm, Sm, and Gd, TM is at least one transition metal element selected from the group consisting of V, Cr, Mn, Co, Ni, Cu, and Zn, and b, c, d, and e are $0 \leq b \leq 0.2$, $0 \leq c \leq 0.04$, $0.09 \leq d \leq 0.13$, and $0 \leq e \leq 1.5$, respectively].

Item 4

The magnetic cooling device of Item 3, in which the magnetic material is an alloy represented by the composition formula $Gd_{1-a}Y_a$ ($0 \leq a \leq 0.05$).

Item 5

The magnetic cooling device of any one of Items 1 to 4, in which the inert gas has an oxygen content of 10 vol % or less.

Item 6

The magnetic cooling device of any one of Items 1 to 5, in which the inert gas is selected from the group consisting of a nitrogen gas, an argon gas, or a mixed gas of nitrogen and argon.

Item 7

The magnetic cooling device of any one of Items 1 to 6, in which the volume proportion of the inert gas in the hollow container is 6 vol % or more and 10 vol % or less.

Item 8

The magnetic cooling device of any one of Items 1 to 7, the material partition has a mesh structure in which a size of an opening is smaller than a particle size of the magnetic material particles.

Item 9

The magnetic cooling device of any one of Items 1 to 8, in which a volume proportion of the gas storages in the hollow container is 10 vol % or more and 50 vol % or less.

Item 10

A magnetic cooling apparatus including the magnetic cooling device of any one of Items 1 to 9.

Item 11

A magnetic cooling method using a magnetic cooling apparatus provided with a magnetic cooling device including: in a hollow container,
an inert gas;
a material filling part containing a refrigerant and magnetic material particles having a magnetocaloric effect;
gas storages containing the refrigerant at both ends of the material filling part; and
material partitions between the material filling part and the gas storages,
in which a particle size d (μm) of the magnetic material particles is 100 μm or more and 3000 μm or less,
a flow velocity v (mm/s) in a magnetic cooling cycle of the refrigerant is 20 mm/s or more and 80 mm/s or less,
a volume proportion x (vol %) of the inert gas in the hollow container is 1 vol % or more and 12 vol % or less, and the following expression (1) is satisfied:

$$x \leq 2.1 v^2/d \text{ and } 1 \leq x \leq 12 \qquad (1).$$

According to the magnetic cooling device of the present disclosure, since the heat exchange property between the magnetic material particles and the refrigerant is improved, it is possible to provide a magnetic cooling device having a high cooling capacity due to the magnetocaloric effect.

Hereinafter, the magnetic cooling device according to the exemplary embodiment of the present disclosure will be described in more detail with reference to the drawings as necessary. However, more detailed description than necessary may be omitted. For example, detailed descriptions of already well-known matters or duplicate descriptions for substantially the same configuration may be omitted. This is to avoid unnecessary verbosity of the description and to facilitate the understanding of those skilled in the art. The applicant provides the accompanying drawings and the following description in order for those skilled in the art to fully understand the present disclosure, which is not intended to limit the subject matter described in the claims. It should be noted that the various elements in the drawings are merely schematically exemplified for the understanding of the present disclosure, and the appearance, dimensional ratio, and the like may differ from the actual ones.

Magnetic Cooling Device 101

Magnetic cooling device 101 of the present disclosure is a device that can be used for cooling (for example, freezing) using a magnetocaloric effect.

Figure 1:
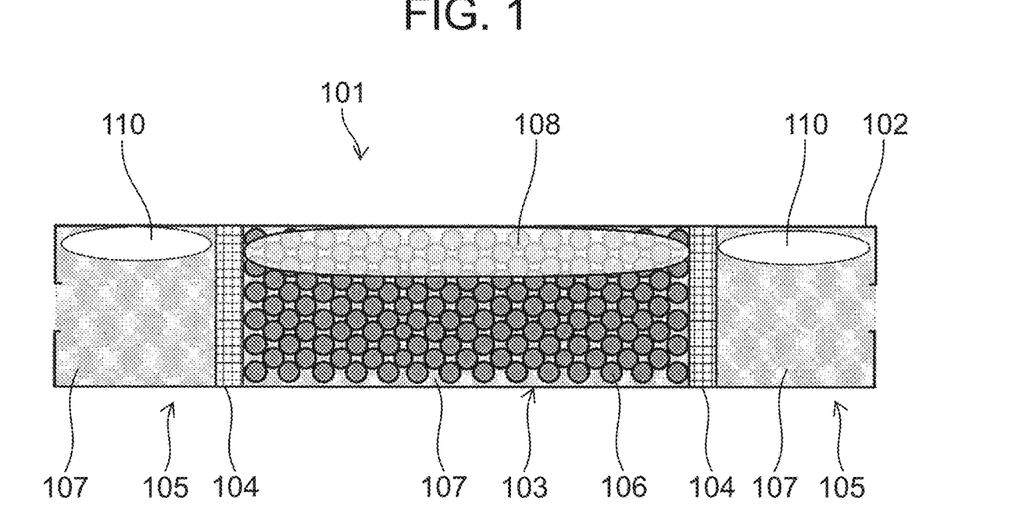
FIG. 1 is a schematic structural sectional view of a magnetic cooling device according to an exemplary embodiment of the present disclosure.

Magnetic cooling device 101 of the present disclosure includes: in hollow container 102,
an inert gas;
material filling part 103 containing a refrigerant and magnetic material particles having a magnetocaloric effect;
gas storages 105 containing the refrigerant at both ends of the material filling part; and
material partitions 104 between the material filling part and the gas storages.

FIG. 1 shows a schematic structural sectional view of magnetic cooling device 101 of the present disclosure. Magnetic cooling device 101 of the present disclosure may include, inside hollow container 102, material filling part 103 at the center, material partitions 104 at both ends in a longitudinal direction thereof (that is, a direction in which heat moves (a direction in which the refrigerant flows)), and gas storages 105 outside the both ends. The inert gas is present in at least one of material filling part 103 and gas storage 105, and the inert gas located in a gap between magnetic material particles 106 of material filling part 103 is referred to as first inert gas 108, and the inert gas located in gas storage 105 is referred to as second inert gas. The details of each configuration will be described with reference to the drawings.

Hollow Container 102

The shape of hollow container 102 is not particularly limited, but generally, a tubular container having a circular or polygonal cross section is used. The material of hollow container 102 is not particularly limited, but may be selected from the viewpoint of thermal conductivity and magnetic transmittance of the material, and may be resin, metal, ceramic, glass, or a combination thereof.

Material Filling Portion 103

Material filling part 103 is filled with magnetic material particles 106, and the gaps thereof are composed of refrigerant 107 and first inert gas 108.

Material filling part 103 may be 30 vol % or more, 40 vol % or more, 50 vol % or more, 55 vol % or more, 60 vol %, or 65 vol % or more, of hollow container 102, and is preferably 50 vol % or more. Material filling part 103 may be 95 vol % or less, 90 vol % or less, 85 vol % or less, 80 vol % or less, 75 vol % or less, or 70 vol % or less, and is preferably 85 vol % or less.

Material Partition 104

Material partition 104 may have a structure in which refrigerant 107 can pass through, the size of the opening is smaller than that of magnetic material particles 106, and magnetic material particles 106 do not pass through. Material partition 104 is installed between material filling part 103 and gas storage 105. Material partition 104 may be made of a mesh such as stainless steel or resin. When magnetic material particles 106 are integrated with a resin binder or the like, a c-ring or an o-ring can be used instead. Material partition 104 enables refrigerant 107 in gas storage 105 to pass through material filling part 103 in a state where material filling part 103 is fixed in hollow container 102.

Gas Storage 105

Gas storage 105 includes second inert gas 110 and refrigerant 107, and second inert gas 110 can use a nitrogen gas, an argon gas, a mixed gas of nitrogen and argon, or the like. Similarly to first inert gas 108, by bubbling refrigerant 107 with second inert gas 110 during the magnetic cooling cycle, it is possible to reduce a dissolved oxygen concentration in refrigerant 107 and reduce deterioration such as corrosion of magnetic material particles 106.

Gas storages 105 (total of gas storage 105 on the low temperature side and a gas storage on the high temperature side) may be 5 vol % or more, 10 vol % or more, 15 vol % or more, or 25 vol % or more, of hollow container 102, and is preferably 10 vol % or more. Gas storage 105 may be 70 vol % or less, 60 vol % or less, 50 vol % or less, or 40 vol % or less, of hollow container 102, and is preferably 50 vol % or less. In addition, in this specification, "~vol % of hollow container 102" means the volume proportion with respect to the internal volume of empty hollow container 102. The volume proportion of gas storage 105 on the low temperature side to the gas storage on the high temperature side may be, for example, 0.2/0.8 to 0.8/0.2 or 0.3/0.7 to 0.7/0.3.

By transporting second inert gas 110 to material filling part 103 during the magnetic cooling cycle, the shortage of first inert gas 108 that has flowed from material filling part 103 to gas storage 105 is supplemented. Since gas storage 105 needs to continue to supply the inert gas into material filling part 103 during the magnetic cooling cycle, gas storage 105 preferably has a shape (for example, a valve structure, a lid structure, or the like) that can prevent second inert gas 110 from flowing out of magnetic cooling device 101.

Magnetic Material Particles 106

As magnetic material particles 106, particles made of a known magnetocaloric material can be used, and may be appropriately selected depending on the environmental temperature during the magnetic cooling cycle, the cooling capacity of the achievement target, and the like. Examples of the magnetocaloric material include a Gd-based magnetocaloric material such as $Gd_{1-a}M_a$ [in the formula, M is at least one element (for example, M is Y) selected from the group consisting of Y, La, Ce, Pr, Nd, Sm, Eu, Tb, Dy, Ho, and Er, and $0 \leq a \leq 0.5$ (for example, $0 \leq a \leq 0.1$ and $0 \leq a \leq 0.05$)]; and a $La(FeSi)_{13}$-based magnetocaloric material such as $(La_{1-b}Re_b)(Fe_{1-c-d}TM_cSi_d)_{13}H_e$ [in the formula, Re is at least one rare earth element selected from the group consisting of Ce, Pr, Nd, Pm, Sm, and Gd, TM is at least one transition metal element selected from the group consisting of V, Cr, Mn, Co, Ni, Cu, and Zn, and b, c, d, and e are $0 \leq b \leq 0.2$, $0 \leq c \leq 0.04$, $0.09 \leq d \leq 0.13$, and $0 \leq e \leq 1.5$, respectively].

Particle size d of magnetic material particles 106 may be 100 μm or more, 200 μm or more, 300 μm or more, 400 μm or more, or 500 μm or more, and is preferably 300 μm or more. Particle size d of magnetic material particles 106 may be 3000 μm or less, 2500 μm or less, 2000 μm or less, 1500 μm or less, or 1000 μm or less, and is preferably 2000 μm or less. When particle size d is 100 μm or more, the pressure loss when transporting refrigerant 107 is small, so that the power consumption for transporting refrigerant 107 can be reduced. On the other hand, when particle size d is smaller than 3000 μm, the surface area where magnetic material particles 106 and refrigerant 107 come into contact with each other becomes large, so that the heat exchange property between magnetic material particles 106 and refrigerant 107 can be significantly increased. The "particle size" means a value of d50 in a volume-based particle size distribution measurement that can be measured using a laser diffraction/scattering particle distribution measuring device.

The filling rate of magnetic material particles 106 in material filling part 103 may be 40 vol % or more, 45 vol % or more, 50 vol % or more, 55 vol % or more, or 60 vol % or more, of material filling part 103, and is preferably 50 vol % or more. The filling rate of magnetic material particles 106 in material filling part 103 may be 90 vol % or less, 85 vol % or less, 80 vol % or less, 75 vol % or less, or 70 vol % or less, of material filling part 103, and is preferably 80 vol % or less. When it is 40 vol % or more, the cooling capacity due to the magnetocaloric effect of magnetic material particles 106 can be improved, and when it is 90 vol % or less, the pressure loss when transporting refrigerant 107 is reduced, so that the power consumption for transporting refrigerant 107 can be reduced.

When the magnetic cooling cycle is performed, a temperature gradient is generated in material filling part 103 in the longitudinal direction of magnetic cooling device 101. Therefore, in material filling part 103, it is preferable that magnetic material particles 106, which exhibit a large magnetocaloric effect in each temperature region at the time of forming the temperature gradient, are multilayered in the longitudinal direction of material filling part 103.

Refrigerant 107

Refrigerant 107 is located in the gap between magnetic material particles 106 in material filling part 103 or located in gas storage 105. As refrigerant 107, known refrigerants such as pure water, alcohol (methanol, ethanol, ethylene glycol, glycerin, propanol, and the like), and an aqueous alcohol solution can be used. In order to realize a stable magnetic cooling cycle, it is preferable to use a refrigerant whose boiling point and freezing point are outside the temperature range reached by the magnetic cooling apparatus.

Inert Gas

The magnetic cooling device includes an inert gas. The inert gas is a gas having low chemical reactivity with the magnetic material particles. The inert gas means a gas whose oxygen content is 10 vol % or less, 8 vol % or less, 5 vol % or less, 2.5 vol % or less, or 1 vol % or less, and is preferably 2.5 vol % or less. The inert gas does not have to contain substantially oxygen. The inert gas may be a nitrogen gas, an argon gas, a mixed gas of nitrogen and argon, or the like. By using the inert gas, the heat exchange property between magnetic material particles 106 and refrigerant 107, which is the effect of the present disclosure, can be improved. Further, by bubbling refrigerant 107 with the inert gas during the magnetic cooling cycle, it is possible to reduce the dissolved oxygen concentration in refrigerant 107 and reduce deterioration such as corrosion of magnetic material particles 106.

First inert gas 108 is an inert gas located in the gap between magnetic material particles 106 of material filling part 103. Second inert gas 110 is an inert gas located in gas storage 105.

The volume proportion of the inert gas in hollow container 102 may be 1 vol % or more, 2 vol % or more, 3 vol % or more, 5 vol % or more, 6 vol % or more, 7 vol % or more, or 8 vol % or more, and is preferably 6 vol % or more. The volume proportion of the inert gas in hollow container 102 may be 12 vol % or less, 10 vol % or less, 9 vol % or less, or 8 vol % or less, and is preferably 10 vol % or less.

Magnetic Cooling Apparatus 111

Figure 2:
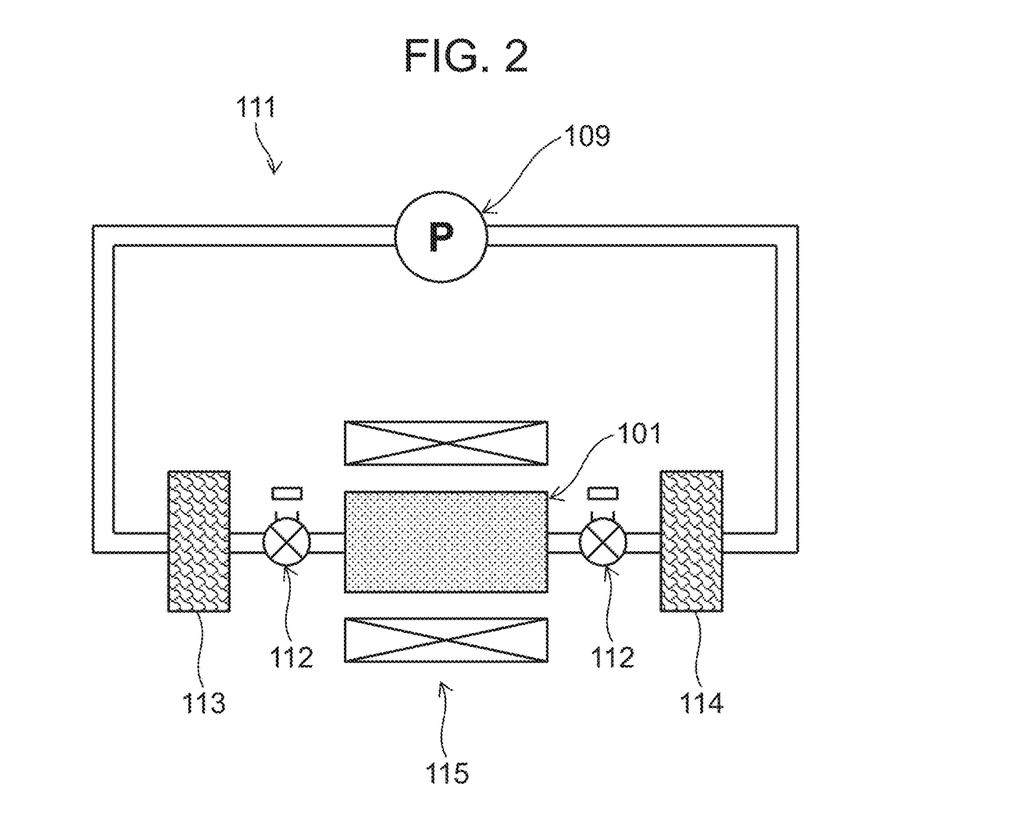
FIG. 2 is a schematic structural sectional view of a magnetic cooling apparatus according to an exemplary embodiment of the present disclosure.

In order to evaluate the cooling capacity of magnetic cooling device 101 of the present disclosure, magnetic cooling apparatus 111 was manufactured. FIG. 2 is a schematic structural sectional view of magnetic cooling apparatus 111. In magnetic cooling apparatus 111, inert gas introduction portions 112 at both ends in the longitudinal direction of the hollow container, low temperature heat exchanger 113 on one outer side thereof, and high temperature heat exchanger 114 on the other outer side are connected by pipes around magnetic cooling device 101 of the present disclosure, and refrigerant transport device 109 is installed between low temperature heat exchanger 113 and high temperature heat exchanger 114 to form a closed circuit of the refrigerant. Further, magnetic field modulator 115 for applying a magnetic field to the magnetic cooling device is installed adjacent to the magnetic cooling device outside the closed circuit of the refrigerant.

Refrigerant Transport Device 109

Refrigerant transport device 109 includes, for example, a piston pump or a rotary pump. Refrigerant transport device 109 is preferably controlled according to the operation of magnetic field modulator 115 described later. When the inert gas is introduced into magnetic cooling device 101, due to a difference in compressibility between the liquid and the gas, the response of the actual refrigerant transport to the operation of refrigerant transport device 109 changes as compared with the case where the inert gas is not present inside magnetic cooling device 101. Since the amount of heat transported from the hot and cold heat generated from the entropy change of magnetic material particles 106 is affected by the operation timing of magnetic field modulator 115 and the actual refrigerant transport, in order to improve the cooling capacity, it is necessary to appropriately correct the operation timings of magnetic field modulator 115 and refrigerant transport device 109 according to the amount of the inert gas introduced.

Inert Gas Introduction Portion 112

Inert gas introduction portions 112 are composed of, for example, a three-way valve, and may be installed at both ends of magnetic cooling device 101 in the longitudinal direction of the hollow container. After filling the closed circuit of the refrigerant to which magnetic cooling device 101 is connected with refrigerant 107, by introducing the inert gas into magnetic cooling device 101 from inert gas introduction portion 112, it is possible to control the amount of the inert gas in magnetic cooling device 101.

Low Temperature Heat Exchanger 113 and High Temperature Heat Exchanger 114

As low temperature heat exchanger 113 and high temperature heat exchanger 114, various heat exchangers such as a tube type (multi-tube type or single-tube type) heat exchanger, a plate type heat exchanger, a fin tube type heat exchanger, a spiral type heat exchanger, a coil type heat exchanger, a condenser type heat exchanger, and an air cooling type heat exchanger can be used.

Magnetic Field Modulator 115

Magnetic field modulator 115 includes a magnetic circuit incorporating a permanent magnet, and can control the relative positions of the magnetic circuit and magnetic cooling device 101 to change them periodically. Magnetic field modulator 115 is connected to an electric cylinder or the like, and can change the relative position with magnetic cooling device 101 by performing periodic motion. The periodic motion may be continuously operated, and its frequency may be 0.01 Hz or higher, 0.1 Hz or higher, or 0.3 Hz or higher, and may be 10 Hz or lower, 5 Hz or lower, or 1 Hz or lower.

Since the entropy change due to the magnetocaloric effect depends on the magnitude of the magnetic field, it is desirable that magnetic field modulator 115 can apply a strong magnetic field to magnetic cooling device 101. Magnetic field modulator 115 can change the magnetic field strength applied to magnetic cooling device 101, for example, between 0 and 5 T, 0 and 3 T, or 0 and 1 T.

Magnetic Cooling Method

The procedure of magnetic cooling using magnetic cooling apparatus 111 including magnetic cooling device 101 will be described. FIGS. 3A to 3D are explanatory diagrams of the operation procedure of magnetic cooling apparatus 111.

Step 1: Exothermic Reaction of Magnetic Material Particles 106

Figure 3A:
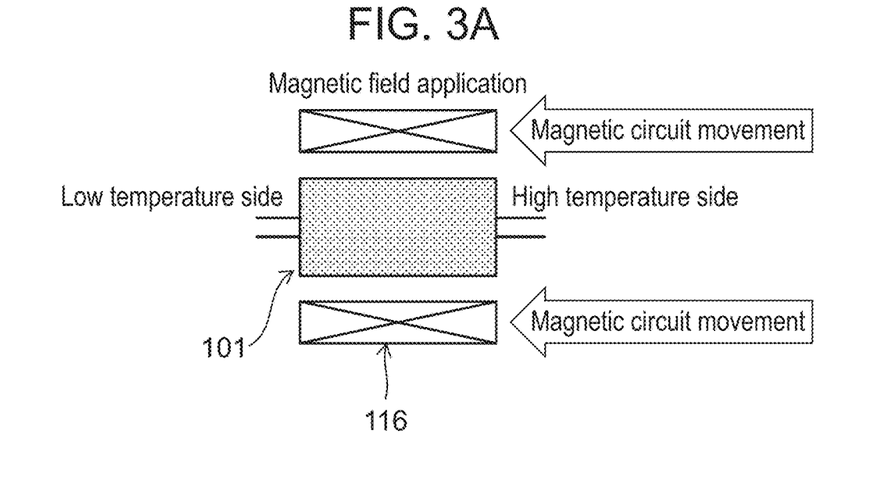
FIG. 3A is a diagram illustrating a cooling operation procedure of the magnetic cooling apparatus according to the exemplary embodiment of the present disclosure.

By bringing the magnetic circuit of magnetic field modulator 115 closer to the side surface of the hollow container of magnetic cooling device 101, a magnetic field is applied to the magnetic cooling device, and magnetic material particles 106 in material filling part 103 generate heat. (FIG. 3A)

Step 2: Thermal Transport to High Temperature Side Heat Exchanger

Figure 3B:
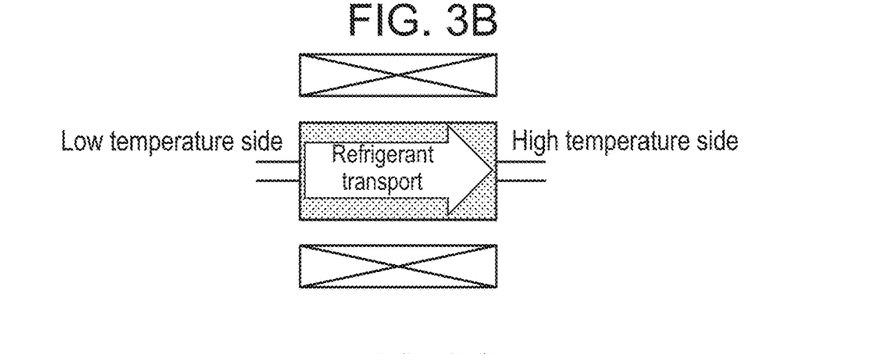
FIG. 3B is a diagram illustrating a cooling operation procedure of the magnetic cooling apparatus according to the exemplary embodiment of the present disclosure.

By operating refrigerant transport device 109, refrigerant 107 in magnetic cooling device 101 is transported from low temperature heat exchanger 113 side to high temperature heat exchanger 114 side. Heat is exchanged between magnetic material particles 106 and refrigerant 107, and refrigerant 107 is transported in a state of storing heat, so that heat is transported to high temperature heat exchanger 114. (FIG. 3B)

Step 3: Cooling Reaction of Magnetic Material Particles 106

Figure 3C:
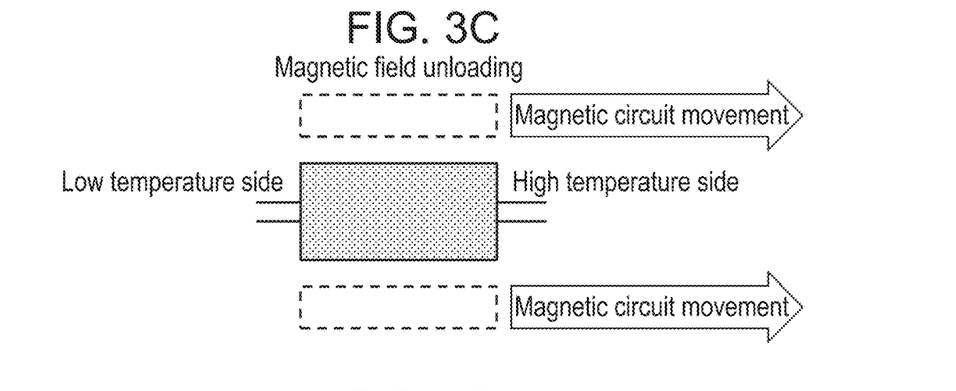
FIG. 3C is a diagram illustrating a cooling operation procedure of the magnetic cooling apparatus according to the exemplary embodiment of the present disclosure.

By moving the magnetic circuit of magnetic field modulator 115, which was close to the side surface of the hollow container of magnetic cooling device 101, away from the side surface of the hollow container of magnetic cooling device 101, the magnetic field applied to magnetic cooling device is removed, so that magnetic material particles 106 in material filling part 103 are cooled. (FIG. 3C)

Step 4: Cold Heat Transport to Low Temperature Heat Exchanger

Figure 3D:
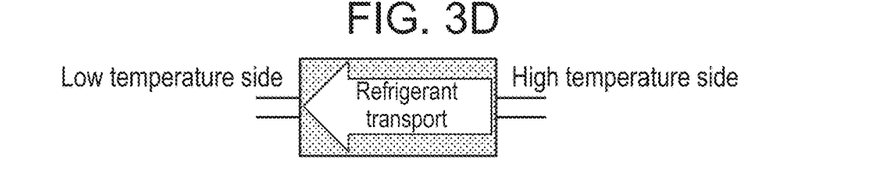
FIG. 3D is a diagram illustrating a cooling operation procedure of the magnetic cooling apparatus according to the exemplary embodiment of the present disclosure.

By transporting refrigerant 107 from high temperature heat exchanger 114 side to low temperature heat exchanger 113 side by refrigerant transport device 109, heat is exchanged between magnetic material particles 106 and refrigerant 107 and refrigerant 107 is transported in a state where cold heat is stored, so that the cold heat is transported to low temperature heat exchanger 113. (FIG. 3D)

By repeating the operations of steps 1 to 4, a temperature difference is formed between low temperature heat exchanger 113 and high temperature heat exchanger 114 while forming a temperature gradient in the longitudinal direction of material filling part 103. The cooling capacity of magnetic cooling apparatus 111 can be evaluated by measuring the temperature difference (ΔT) between high temperature heat exchanger 114 side and low temperature heat exchanger 113 side at the end of magnetic cooling device 101 during the magnetic cooling cycle.

In the cycles of steps 1 to 4, the flow velocity of refrigerant 107 may be 20 mm/s or more, 30 mm/s or more, 40 mm/s or more, or 50 mm/s or more. The flow velocity of refrigerant 107 may be 80 mm/s or less, 75 mm/s or less, 70 mm/s or less, or 65 mm/s or less. When the flow velocity is 20 mm/s or more, the amount of heat moving in magnetic cooling device 101 per unit time becomes large, and the magnetic cooling apparatus can function well as a cooling apparatus. Further, when the flow velocity is smaller than 80 mm/s, in addition to the significant reduction in power consumption due to pressure loss, the heat exchange inside magnetic material particles 106 is sufficiently performed, and the magnetic cooling apparatus can function well as a cooling apparatus. The "flow velocity" of refrigerant 107 is a linear velocity calculated by dividing a discharge speed of refrigerant transport device 109 during operation by the cross-sectional area of gas storage 105.

The relationship satisfied by conditions of particle size d (μm) of magnetic material particles 106 and flow velocity v (mm/s) of refrigerant 107 included in the magnetic cooling device, and volume proportion x (vol %) of inert gas 108 in hollow container 102 at that time may be as follows.

$$x \leq 2.1 v^2/d \text{ and } 1 \leq x \leq 12 \quad (1)$$

Expression (1) shows that within the range of a constant particle size and a constant flow velocity, the smaller the particle size and the faster the flow velocity, the easier it is for inert gas 108 to be stirred. When the inert gas is introduced excessively with respect to the relational expression of the particle size and the flow velocity, some of the introduced inert gas stays in the upper part of magnetic cooling device 101 without being stirred. Accordingly, it is presumed that the effect of reducing the heat capacity of entire magnetic cooling device 101 becomes larger than the effect of stirring in the wake region, and ΔT decreases.

According to the present exemplary embodiment, the inert gas flows between magnetic material particles 106 with temporal and spatial variations, so that the wake region of magnetic material particles 106 can be effectively stirred, and the heat exchange property between magnetic material particles 106 and refrigerant 107 can be improved. This makes it possible to provide magnetic cooling device 101 having a high cooling capacity due to the magnetocaloric effect.

EXAMPLES

Hereinafter, the present disclosure will be described in more detail with reference to Examples and Comparative Examples, but the present disclosure is not limited to these examples.

Example 1-1

In order to investigate the change in ΔT due to the amount of the inert gas introduced in material filling part 103, magnetic cooling apparatus 111 as shown in FIG. 2 was used for continuous operation, and ΔT was measured 1 hour after the start of operation. The specific configuration of magnetic cooling device 101 in the present example is as follows.

Material Filling Portion 103

A total of 90 g of Gd-based alloy having an average particle size of 600 μm was used for magnetic material particles 106. The filling rate of magnetic material particles 106 was 62 vol % of material filling part 103. In order to facilitate the development of the magnetocaloric effect, magnetic material particles 106 were filled in multiple layers so that the weight proportion was 1:1:2 in order of $Gd_{0.95}Y_{0.05}$, $Gd_{0.975}Y_{0.025}$, and Gd from the low temperature side to the high temperature side of material filling part 103. Pure water was used as refrigerant 107, and a nitrogen gas was introduced as an inert gas in an amount of 1 vol % of hollow container 102.

Gas Storage 105

A cylindrical container with an inner diameter of Φ14 mm was used for hollow container 102, and lids connecting pipes having an outer diameter of Φ6.35 mm coaxially to hollow container 102 were attached to both ends thereof, and hollow container 102 was installed so that the longitudinal direction thereof was horizontal to the ground. Thereby, the shape in which second inert gas 110 did not flow out from magnetic cooling device 101 was made. The volume proportion of gas storage 105 in hollow container 102 was 40 vol %.

Material Partition 104

Magnetic material particles 106 of material filling part 103 were fixed to material partition 104 using a stainless steel mesh having an opening size of 0.06 mm.

The configuration of magnetic cooling apparatus 111 used for the evaluation is as follows.

Refrigerant Transport Device 109

A piston pump having an inner diameter of Φ25 mm was used for refrigerant transport device 109. The flow velocity of refrigerant 107 during operation of refrigerant transport device 109 was 60 mm/s.

Low Temperature Heat Exchanger 113 and High Temperature Heat Exchanger 114

As low temperature heat exchanger 113 and high temperature heat exchanger 114, copper pipes having an outer diameter of Φ6.35 mm and a length of 0.5 m were used.

Magnetic Field Modulator 115

Magnetic field modulator 115 includes a magnetic circuit using a permanent magnet, and can apply a magnetic field of 1.0 T on average to magnetic cooling device 101. Magnetic field modulator 115 is connected to an electric cylinder, and can change the relative position with magnetic cooling device 101 by performing reciprocating motion, and can change the magnetic field strength applied to magnetic cooling device 101 between 0 and 1.0 T. The reciprocating motion was continuously operated at 0.5 Hz. The measurement results of ΔT are shown in Table 1. Table 1 also shows the amount of increase in ΔT as compared with the case where the magnetic cooling cycle was performed in the same manner except that first inert gas 108 and second inert gas 110 of magnetic cooling device 101 were replaced with refrigerant 107.

Example 1-2

The magnetic cooling cycle was performed in the same manner as in Example 1-1 except that the volume proportion of the inert gas in the hollow container was changed to 2 vol %. The measurement and evaluation results of ΔT are shown in Table 1.

Example 1-3

The magnetic cooling cycle was performed in the same manner as in Example 1-1 except that the volume proportion of the inert gas in the hollow container was changed to 6 vol %. The measurement and evaluation results of ΔT are shown in Table 1.

Example 1-4

The magnetic cooling cycle was performed in the same manner as in Example 1-1 except that the volume proportion of the inert gas in the hollow container was changed to 10 vol %. The measurement and evaluation results of ΔT are shown in Table 1.

Example 1-5

The magnetic cooling cycle was performed in the same manner as in Example 1-1 except that the volume proportion of the inert gas in the hollow container was changed to 12 vol %. The measurement and evaluation results of ΔT are shown in Table 1.

Comparative Example 1-1

The magnetic cooling cycle was performed in the same manner as in Example 1-1 except that first inert gas 108 and second inert gas 110 were replaced with refrigerant 107. The measurement and evaluation results of ΔT are shown in Table 1.

Comparative Example 1-2

The magnetic cooling cycle was performed in the same manner as in Example 1-1 except that the volume proportion of the inert gas in the hollow container was changed to 0.5 vol %. The measurement and evaluation results of ΔT are shown in Table 1.

Comparative Example 1-3

The magnetic cooling cycle was performed in the same manner as in Example 1-1 except that the volume proportion of the inert gas in the hollow container was changed to 14 vol %. The measurement and evaluation results of ΔT are shown in Table 1.

Example 2-1

In order to investigate the influence of the particle size of magnetic material particles 106 and the flow velocity of refrigerant 107 on ΔT when the volume proportion of first inert gas 108 in the hollow container was 1 vol %, the magnetic cooling cycle was performed in the same manner as in Example 1-1 except that the volume proportion of the inert gas in the hollow container was set to 1 vol %, the flow velocity of refrigerant 107 and the average particle size of magnetic material particles 106 were replaced with 20 mm/s and 100 μm, respectively. The measurement results of ΔT are shown in Table 2. Table 2 also shows the amount of increase in ΔT as compared with the case where the magnetic cooling cycle was performed in the same manner except that first inert gas 108 and second inert gas 110 of magnetic cooling device 101 were replaced with refrigerant 107.

Example 2-2

The magnetic cooling cycle was performed in the same manner as in Example 2-1 except that the average particle size of magnetic material particles 106 and the flow velocity of refrigerant 107 were replaced with 100 μm and 40 mm/s, respectively. The measurement and evaluation results of ΔT are shown in Table 2.

Example 2-3

The magnetic cooling cycle was performed in the same manner as in Example 2-1 except that the average particle size of magnetic material particles 106 and the flow velocity of refrigerant 107 were replaced with 100 μm and 60 mm/s, respectively. The measurement and evaluation results of ΔT are shown in Table 2.

Example 2-4

The magnetic cooling cycle was performed in the same manner as in Example 2-1 except that the average particle size of magnetic material particles 106 and the flow velocity of refrigerant 107 were replaced with 100 μm and 80 mm/s, respectively. The measurement and evaluation results of ΔT are shown in Table 2.

Example 2-5

The magnetic cooling cycle was performed in the same manner as in Example 2-1 except that the average particle size of magnetic material particles 106 and the flow velocity of refrigerant 107 were replaced with 1000 μm and 40 mm/s, respectively. The measurement and evaluation results of ΔT are shown in Table 2.

Example 2-6

The magnetic cooling cycle was performed in the same manner as in Example 2-1 except that the average particle size of magnetic material particles 106 and the flow velocity of refrigerant 107 were replaced with 1000 μm and 60 mm/s, respectively. The measurement and evaluation results of ΔT are shown in Table 2.

Example 2-7

The magnetic cooling cycle was performed in the same manner as in Example 2-1 except that the average particle size of magnetic material particles 106 and the flow velocity of refrigerant 107 were replaced with 1000 μm and 80 mm/s, respectively. The measurement and evaluation results of ΔT are shown in Table 2.

Example 2-8

The magnetic cooling cycle was performed in the same manner as in Example 2-1 except that the average particle size of magnetic material particles 106 and the flow velocity of refrigerant 107 were replaced with 2000 μm and 40 mm/s, respectively. The measurement and evaluation results of ΔT are shown in Table 2.

Example 2-9

The magnetic cooling cycle was performed in the same manner as in Example 2-1 except that the average particle size of magnetic material particles 106 and the flow velocity of refrigerant 107 were replaced with 2000 μm and 60 mm/s, respectively. The measurement and evaluation results of ΔT are shown in Table 2.

Example 2-10

The magnetic cooling cycle was performed in the same manner as in Example 2-1 except that the average particle size of magnetic material particles 106 and the flow velocity of refrigerant 107 were replaced with 2000 μm and 80 mm/s, respectively. The measurement and evaluation results of ΔT are shown in Table 2.

Example 3-1

In order to investigate the influence of the particle size of magnetic material particles 106 and the flow velocity of refrigerant 107 on ΔT when the volume proportion of first inert gas 108 in the hollow container was 4 vol %, the magnetic cooling cycle was performed in the same manner as in Example 2-1 except that the volume proportion of the inert gas in the hollow container was replaced with 4 vol %. The results are shown in Table 3. Table 3 also shows the amount of increase in ΔT as compared with the case where the magnetic cooling cycle was performed in the same manner except that the inert gas of magnetic cooling device 101 was replaced with refrigerant 107.

Example 3-2

The magnetic cooling cycle was performed in the same manner as in Example 3-1 except that the average particle size of magnetic material particles 106 and the flow velocity of refrigerant 107 were replaced with 100 μm and 40 mm/s, respectively. The measurement and evaluation results of ΔT are shown in Table 3.

Example 3-3

The magnetic cooling cycle was performed in the same manner as in Example 3-1 except that the average particle size of magnetic material particles 106 and the flow velocity of refrigerant 107 were replaced with 100 μm and 60 mm/s, respectively. The measurement and evaluation results of ΔT are shown in Table 3.

Example 3-4

The magnetic cooling cycle was performed in the same manner as in Example 3-1 except that the average particle size of magnetic material particles 106 and the flow velocity of refrigerant 107 were replaced with 100 μm and 80 mm/s, respectively. The measurement and evaluation results of ΔT are shown in Table 3.

Example 3-5

The magnetic cooling cycle was performed in the same manner as in Example 3-1 except that the average particle size of magnetic material particles 106 and the flow velocity of refrigerant 107 were replaced with 1000 μm and 60 mm/s, respectively. The measurement and evaluation results of ΔT are shown in Table 3.

Example 3-6

The magnetic cooling cycle was performed in the same manner as in Example 3-1 except that the average particle size of magnetic material particles 106 and the flow velocity of refrigerant 107 were replaced with 1000 μm and 80 mm/s, respectively. The measurement and evaluation results of ΔT are shown in Table 3.

Example 3-7

The magnetic cooling cycle was performed in the same manner as in Example 3-1 except that the average particle size of magnetic material particles 106 and the flow velocity of refrigerant 107 were replaced with 2000 μm and 80 mm/s, respectively. The measurement and evaluation results of ΔT are shown in Table 3.

Comparative Example 3-1

The magnetic cooling cycle was performed in the same manner as in Example 3-1 except that the average particle size of magnetic material particles 106 and the flow velocity of refrigerant 107 were replaced with 2000 μm and 20 mm/s, respectively. The measurement and evaluation results of ΔT are shown in Table 3.

Comparative Example 3-2

The magnetic cooling cycle was performed in the same manner as in Example 3-1 except that the average particle size of magnetic material particles 106 and the flow velocity of refrigerant 107 were replaced with 2000 μm and 40 mm/s, respectively. The measurement and evaluation results of ΔT are shown in Table 3.

Example 4-1

In order to investigate the influence of the particle size of magnetic material particles 106 and the flow velocity of refrigerant 107 on ΔT when the volume proportion of first inert gas 108 in the hollow container was 7 vol %, the magnetic cooling cycle was performed in the same manner as in Example 2-1 except that the volume proportion of the inert gas in the hollow container was replaced with 7 vol %. The results are shown in Table 3. Table 3 also shows the amount of increase in ΔT as compared with the case where the magnetic cooling cycle was performed in the same manner except that first inert gas 108 and second inert gas 110 of magnetic cooling device 101 were replaced with refrigerant 107.

Example 4-2

The magnetic cooling cycle was performed in the same manner as in Example 4-1 except that the average particle size of magnetic material particles 106 and the flow velocity of refrigerant 107 were replaced with 100 μm and 40 mm/s, respectively. The measurement and evaluation results of ΔT are shown in Table 4.

Example 4-3

The magnetic cooling cycle was performed in the same manner as in Example 4-1 except that the average particle size of magnetic material particles 106 and the flow velocity of refrigerant 107 were replaced with 100 μm and 60 mm/s, respectively. The measurement and evaluation results of ΔT are shown in Table 4.

Example 4-4

The magnetic cooling cycle was performed in the same manner as in Example 4-1 except that the average particle size of magnetic material particles 106 and the flow velocity of refrigerant 107 were replaced with 100 μm and 80 mm/s, respectively. The measurement and evaluation results of ΔT are shown in Table 4.

Example 4-5

The magnetic cooling cycle was performed in the same manner as in Example 4-1 except that the average particle size of magnetic material particles 106 and the flow velocity of refrigerant 107 were replaced with 1000 μm and 80 mm/s, respectively. The measurement and evaluation results of ΔT are shown in Table 4.

Comparative Example 4-1

The magnetic cooling cycle was performed in the same manner as in Example 4-1 except that the average particle size of magnetic material particles 106 and the flow velocity of refrigerant 107 were replaced with 1000 μm and 20 mm/s, respectively. The measurement and evaluation results of ΔT are shown in Table 4.

Comparative Example 4-2

The magnetic cooling cycle was performed in the same manner as in Example 4-1 except that the average particle size of magnetic material particles 106 and the flow velocity of refrigerant 107 were replaced with 1000 μm and 40 mm/s, respectively. The measurement and evaluation results of ΔT are shown in Table 4.

Comparative Example 4-3

The magnetic cooling cycle was performed in the same manner as in Example 4-1 except that the average particle size of magnetic material particles 106 and the flow velocity of refrigerant 107 were replaced with 2000 μm and 20 mm/s, respectively. The measurement and evaluation results of ΔT are shown in Table 4.

Comparative Example 4-4

The magnetic cooling cycle was performed in the same manner as in Example 4-1 except that the average particle size of magnetic material particles 106 and the flow velocity of refrigerant 107 were replaced with 2000 μm and 40 mm/s, respectively. The measurement and evaluation results of ΔT are shown in Table 4.

Comparative Example 4-5

The magnetic cooling cycle was performed in the same manner as in Example 4-1 except that the average particle size of magnetic material particles 106 and the flow velocity of refrigerant 107 were replaced with 2000 μm and 60 mm/s, respectively. The measurement and evaluation results of ΔT are shown in Table 4.

Comparative Example 4-6

The magnetic cooling cycle was performed in the same manner as in Example 4-1 except that the average particle size of magnetic material particles 106 and the flow velocity of refrigerant 107 were replaced with 2000 μm and 80 mm/s, respectively. The measurement and evaluation results of ΔT are shown in Table 4.

Example 5-1

In order to investigate the influence of the particle size of magnetic material particles 106 and the flow velocity of refrigerant 107 on ΔT when the volume proportion of first inert gas 108 in the hollow container was 10 vol %, the magnetic cooling cycle was performed in the same manner as in Example 2-1 except that the volume proportion of the inert gas in the hollow container was set to 10 vol %, the average particle size of magnetic material particles 106 and the flow velocity of refrigerant 107 were replaced with 100 μm and 40 mm/s, respectively. The results are shown in Table 5. Table 5 also shows the amount of increase in ΔT as compared with the case where the magnetic cooling cycle was performed in the same manner except that the inert gas of magnetic cooling device 101 was replaced with refrigerant 107.

Example 5-2

The magnetic cooling cycle was performed in the same manner as in Example 5-1 except that the average particle size of magnetic material particles 106 and the flow velocity of refrigerant 107 were replaced with 100 μm and 60 mm/s, respectively. The measurement and evaluation results of ΔT are shown in Table 5.

Example 5-3

The magnetic cooling cycle was performed in the same manner as in Example 5-1 except that the average particle size of magnetic material particles 106 and the flow velocity of refrigerant 107 were replaced with 100 μm and 80 mm/s, respectively. The measurement and evaluation results of ΔT are shown in Table 5.

Example 5-4

The magnetic cooling cycle was performed in the same manner as in Example 5-1 except that the average particle size of magnetic material particles 106 and the flow velocity of refrigerant 107 were replaced with 1000 μm and 80 mm/s, respectively. The measurement and evaluation results of ΔT are shown in Table 5.

Comparative Example 5-1

The magnetic cooling cycle was performed in the same manner as in Example 5-1 except that the average particle size of magnetic material particles 106 and the flow velocity of refrigerant 107 were replaced with 1000 μm and 20 mm/s, respectively. The measurement and evaluation results of ΔT are shown in Table 5.

Comparative Example 5-2

The magnetic cooling cycle was performed in the same manner as in Example 5-1 except that the average particle size of magnetic material particles 106 and the flow velocity of refrigerant 107 were replaced with 1000 μm and 40 mm/s, respectively. The measurement and evaluation results of ΔT are shown in Table 5.

Comparative Example 5-3

The magnetic cooling cycle was performed in the same manner as in Example 5-1 except that the average particle size of magnetic material particles 106 and the flow velocity of refrigerant 107 were replaced with 2000 μm and 20 mm/s, respectively. The measurement and evaluation results of ΔT are shown in Table 5.

Comparative Example 5-4

The magnetic cooling cycle was performed in the same manner as in Example 5-1 except that the average particle size of magnetic material particles 106 and the flow velocity of refrigerant 107 were replaced with 2000 μm and 40 mm/s, respectively. The measurement and evaluation results of ΔT are shown in Table 5.

Comparative Example 5-5

The magnetic cooling cycle was performed in the same manner as in Example 5-1 except that the average particle size of magnetic material particles 106 and the flow velocity of refrigerant 107 were replaced with 2000 μm and 60 mm/s, respectively. The measurement and evaluation results of ΔT are shown in Table 5.

Comparative Example 5-6

The magnetic cooling cycle was performed in the same manner as in Example 5-1 except that the average particle size of magnetic material particles 106 and the flow velocity of refrigerant 107 were replaced with 2000 μm and 80 mm/s, respectively. The measurement and evaluation results of ΔT are shown in Table 5.

Example 6-1

In order to investigate the influence of the particle size of magnetic material particles 106 and the flow velocity of refrigerant 107 on ΔT when the volume proportion of first inert gas 108 in the hollow container was 12 vol %, the magnetic cooling cycle was performed in the same manner as in Example 2-1 except that the volume proportion of the inert gas in the hollow container was set to 12 vol %, the average particle size of magnetic material particles 106 and the flow velocity of refrigerant 107 were replaced with 100 μm and 40 mm/s, respectively. The results are shown in Table 6. Table 6 also shows the amount of increase in ΔT as compared with the case where the magnetic cooling cycle was performed in the same manner except that the inert gas of magnetic cooling device 101 was replaced with refrigerant 107.

Example 6-2

The magnetic cooling cycle was performed in the same manner as in Example 6-1 except that the average particle size of magnetic material particles 106 and the flow velocity of refrigerant 107 were replaced with 100 μm and 60 mm/s, respectively. The measurement and evaluation results of ΔT are shown in Table 6.

Example 6-3

The magnetic cooling cycle was performed in the same manner as in Example 6-1 except that the average particle size of magnetic material particles 106 and the flow velocity of refrigerant 107 were replaced with 100 μm and 80 mm/s, respectively. The measurement and evaluation results of ΔT are shown in Table 6.

Example 6-4

The magnetic cooling cycle was performed in the same manner as in Example 6-1 except that the average particle size of magnetic material particles 106 and the flow velocity of refrigerant 107 were replaced with 1000 μm and 80 mm/s, respectively. The measurement and evaluation results of ΔT are shown in Table 6.

Comparative Example 6-1

The magnetic cooling cycle was performed in the same manner as in Example 6-1 except that the average particle size of magnetic material particles 106 and the flow velocity of refrigerant 107 were replaced with 1000 μm and 20 mm/s, respectively. The measurement and evaluation results of ΔT are shown in Table 6.

Comparative Example 6-2

The magnetic cooling cycle was performed in the same manner as in Example 6-1 except that the average particle size of magnetic material particles 106 and the flow velocity of refrigerant 107 were replaced with 1000 μm and 40 mm/s, respectively. The measurement and evaluation results of ΔT are shown in Table 6.

Comparative Example 6-3

The magnetic cooling cycle was performed in the same manner as in Example 6-1 except that the average particle size of magnetic material particles 106 and the flow velocity of refrigerant 107 were replaced with 2000 μm and 20 mm/s, respectively. The measurement and evaluation results of ΔT are shown in Table 6.

Comparative Example 6-4

The magnetic cooling cycle was performed in the same manner as in Example 6-1 except that the average particle size of magnetic material particles 106 and the flow velocity of refrigerant 107 were replaced with 2000 μm and 40 mm/s, respectively. The measurement and evaluation results of ΔT are shown in Table 6.

Comparative Example 6-5

The magnetic cooling cycle was performed in the same manner as in Example 6-1 except that the average particle size of magnetic material particles 106 and the flow velocity of refrigerant 107 were replaced with 2000 μm and 60 mm/s, respectively. The measurement and evaluation results of ΔT are shown in Table 6.

Comparative Example 6-6

The magnetic cooling cycle was performed in the same manner as in Example 6-1 except that the average particle size of magnetic material particles 106 and the flow velocity of refrigerant 107 were replaced with 2000 μm and 80 mm/s, respectively. The measurement and evaluation results of ΔT are shown in Table 6.

From Example 1 and Comparative Example 1, it was apparent that when the volume proportion of the inert gas in the hollow container was smaller than 1 vol %, there was no effect of increasing ΔT. This is because when the volume proportion of the inert gas in the hollow container is very small, the inert gas stays at the interface between hollow container 102 and magnetic material particles 106 constituting magnetic cooling device 101 and does not stir the wake region of magnetic material particles 106. Further, by comparing Comparative Example 1-1 and Comparative Example 1-3, it was apparent that even when the volume proportion of the inert gas in the hollow container was larger than 13 vol %, there was no effect of increasing ΔT, but rather decreasing ΔT. This is because the influence of the decrease in the heat capacity of entire magnetic cooling device 101 due to the decrease in the volume proportion of refrigerant 107 is larger than the effect of increasing ΔT by stirring in the wake region, in addition to the difficulty in controlling the actual refrigerant transport due to the increased compression of the inert gas.

From Examples 2 to 6 and Comparative Examples, it was found that the introduction of first inert gas 108 had the effect of increasing ΔT under the conditions that the flow velocity of refrigerant 107 is large and the particle size of magnetic material particles 106 is small. From Examples 2 to 6 and Comparative Examples, it was apparent that when the volume proportion of the inert gas in the hollow container was 1 to 12 vol %, ΔT was larger than that when the inert gas was not contained. Furthermore, it was apparent that when the volume proportion of the inert gas in the hollow container was 6 to 10 vol %, ΔT became larger.

It was apparent that when the particle size of magnetic material particles 106 and the flow velocity of refrigerant 107 satisfied certain conditions, the introduction of the inert gas had the effect of increasing ΔT, and the conditions of the particle size of magnetic material particles 106 and the flow velocity of the refrigerant 107 for increasing ΔT changed according to the amount of the inert gas. From these results, the relationship satisfied by particle size d (μm) of magnetic material particles 106, flow velocity v (mm/s) of refrigerant 107, and volume proportion x (vol %) of inert gas 108 in hollow container 102, which have the effect of increasing ΔT by introducing the inert gas, was determined.

As a result, it was found that the introduction of the inert gas has the effect of increasing ΔT when the relationship of $x \leq 2.1\ v^2/d$ and $1 \leq x \leq 12$ (1) is satisfied.

TABLE 1

|  | Amount of inert gas x (vol %) | Particle size d (μm) | Flow velocity v (mm/s) | Temperature difference which is formed ΔT (° C.) | Amount of increase of Temperature difference ΔT due to introduction of inert gas (° C.) |
| --- | --- | --- | --- | --- | --- |
| Example 1-1 | 1 | 600 | 60 | 23.8 | 0.4 |
| Example 1-2 | 2 | 600 | 60 | 24.3 | 0.9 |
| Example 1-3 | 6 | 600 | 60 | 27.8 | 4.4 |
| Example 1-4 | 10 | 600 | 60 | 27.6 | 4.2 |
| Example 1-5 | 12 | 600 | 60 | 24.4 | 1 |
| Comparative Example 1-1 | 0 | 600 | 60 | 23.4 |  |
| Comparative Example 1-2 | 0.5 | 600 | 60 | 23.4 | 0 |
| Comparative Example 1-3 | 14 | 600 | 60 | 18.4 | −5.0 |

TABLE 2

|  | Amount of inert gas x (vol %) | Particle size d (μm) | Flow velocity v (mm/s) | Temperature difference which is formed ΔT (° C.) | Amount of increase of Temperature difference ΔT due to introduction of inert gas (° C.) |
| --- | --- | --- | --- | --- | --- |
| Example 2-1 | 1 | 100 | 20 | 23.5 | 0.1 |
| Example 2-2 | 1 | 100 | 40 | 23.9 | 0.2 |
| Example 2-3 | 1 | 100 | 60 | 24.3 | 0.3 |
| Example 2-4 | 1 | 100 | 80 | 24.8 | 0.6 |
| Example 2-5 | 1 | 1000 | 40 | 23.5 | 0.2 |
| Example 2-6 | 1 | 1000 | 60 | 23.8 | 0.3 |
| Example 2-7 | 1 | 1000 | 80 | 23.8 | 0.4 |
| Example 2-8 | 1 | 2000 | 40 | 23 | 0.2 |
| Example 2-9 | 1 | 2000 | 60 | 23.4 | 0.2 |
| Example 2-10 | 1 | 2000 | 80 | 23.7 | 0.3 |

TABLE 3

|  | Amount of inert gas x (vol %) | Particle size d (μm) | Flow velocity v (mm/s) | Temperature difference which is formed ΔT (° C.) | Amount of increase of Temperature difference ΔT due to introduction of inert gas (° C.) |
|---|---|---|---|---|---|
| Example 3-1 | 4 | 100 | 20 | 25.6 | 0.2 |
| Example 3-2 | 4 | 100 | 40 | 27.1 | 1.4 |
| Example 3-3 | 4 | 100 | 60 | 28.3 | 2.3 |
| Example 3-4 | 4 | 100 | 80 | 28.8 | 2.6 |
| Example 3-5 | 4 | 1000 | 60 | 26.6 | 1.1 |
| Example 3-6 | 4 | 1000 | 80 | 25.8 | 2.4 |
| Example 3-7 | 4 | 2000 | 80 | 25.1 | 1.0 |
| Comparative Example 3-1 | 4 | 2000 | 20 | 23.9 | −0.7 |
| Comparative Example 3-2 | 4 | 2000 | 40 | 24.5 | −0.4 |

TABLE 4

|  | Amount of inert gas x (vol %) | Particle size d (μm) | Flow velocity v (mm/s) | Temperature difference which is formed ΔT (° C.) | Amount of increase of Temperature difference ΔT due to introduction of inert gas (° C.) |
|---|---|---|---|---|---|
| Example 4-1 | 7 | 100 | 20 | 28.2 | 0.3 |
| Example 4-2 | 7 | 100 | 40 | 30.3 | 2.1 |
| Example 4-3 | 7 | 100 | 60 | 32.4 | 3.9 |
| Example 4-4 | 7 | 100 | 80 | 33.9 | 5.2 |
| Example 4-5 | 7 | 1000 | 80 | 28.3 | 4.9 |
| Comparative Example 4-1 | 7 | 1000 | 20 | 26.9 | −0.5 |
| Comparative Example 4-2 | 7 | 1000 | 40 | 27.3 | −0.4 |
| Comparative Example 4-3 | 7 | 2000 | 20 | 25.4 | −1.6 |
| Comparative Example 4-4 | 7 | 2000 | 40 | 25.9 | −1.4 |
| Comparative Example 4-5 | 7 | 2000 | 60 | 26.5 | −1.1 |
| Comparative Example 4-6 | 7 | 2000 | 80 | 27.0 | −0.9 |

TABLE 5

|  | Amount of inert gas x (vol %) | Particle size d (μm) | Flow velocity v (mm/s) | Temperature difference which is formed ΔT (° C.) | Amount of increase of Temperature difference ΔT due to introduction of inert gas (° C.) |
|---|---|---|---|---|---|
| Example 5-1 | 10 | 100 | 40 | 28.8 | 1.3 |
| Example 5-2 | 10 | 100 | 60 | 30.9 | 3.1 |
| Example 5-3 | 10 | 100 | 80 | 32.6 | 4.6 |
| Example 5-4 | 10 | 1000 | 80 | 27.6 | 4.2 |
| Comparative Example 5-1 | 10 | 1000 | 20 | 24.3 | −2.4 |
| Comparative Example 5-2 | 10 | 1000 | 40 | 25.1 | −1.9 |
| Comparative Example 5-3 | 10 | 2000 | 20 | 23.1 | −3.2 |
| Comparative Example 5-4 | 10 | 2000 | 40 | 23.8 | −2.8 |
| Comparative Example 5-5 | 10 | 2000 | 60 | 25.3 | −1.6 |
| Comparative Example 5-6 | 10 | 2000 | 80 | 26.1 | −1.1 |

TABLE 6

| | Amount of inert gas x (vol %) | Particle size d (μm) | Flow velocity v (mm/s) | Temperature difference which is formed ΔT (° C.) | Amount of increase of Temperature difference ΔT due to introduction of inert gas (° C.) |
|---|---|---|---|---|---|
| Example 6-1 | 12 | 100 | 40 | 24.7 | 0.4 |
| Example 6-2 | 12 | 100 | 60 | 25.5 | 0.9 |
| Example 6-3 | 12 | 100 | 80 | 26 | 1.2 |
| Example 6-4 | 12 | 1000 | 80 | 24.4 | 1 |
| Comparative Example 6-1 | 12 | 1000 | 20 | 21.5 | −2.1 |
| Comparative Example 6-2 | 12 | 1000 | 40 | 22.6 | −1.3 |
| Comparative Example 6-3 | 12 | 2000 | 20 | 19.5 | −3.8 |
| Comparative Example 6-4 | 12 | 2000 | 40 | 20.2 | −3.3 |
| Comparative Example 6-5 | 12 | 2000 | 60 | 21.9 | −1.9 |
| Comparative Example 6-6 | 12 | 2000 | 80 | 22.8 | −1.2 |

Although some exemplary embodiments have been described above, it will be understood that various modifications of the exemplary embodiments are possible without departing from the spirit and scope of the claims.

The magnetic cooling device of the present disclosure has high heat exchange properties between a refrigerant and a magnetic material having a magnetocaloric effect, and can be thus used for cooling (freezing) applications. For example, it can be applied to refrigerators, freezers, cooling apparatuses used as part of a hydrogen liquefaction process, and temperature control devices such as air conditioners and heat retaining devices.

What is claimed is:

1. A magnetic cooling device comprising:
   in a hollow container,
   an inert gas;
   a material filling part containing a refrigerant and magnetic material particles having a magnetocaloric effect;
   gas storages containing the refrigerant at both ends of the material filling part; and
   material partitions between the material filling part and the gas storages,
   wherein a volume proportion of the inert gas in the hollow container is 1 vol % or more and 12 vol % or less,
   wherein the magnetic material particles are at least one selected from the group consisting of:

$Gd_{1-a}M_a$ where, M is at least one element selected from the group consisting of Y, La, Ce, Pr, Nd, Sm, Eu, Tb, Dy, Ho, and Er, and $0 \leq a \leq 0.5$; and $(La_{1-b}Re_b)(Fe_{1-c-d}TM_cSi_d)_{13}H_e$ where, Re is at least one rare earth element selected from the group consisting of Ce, Pr, Nd, Pm, Sm, and Gd, TM is at least one transition metal element selected from the group consisting of V, Cr, Mn, Co, Ni, Cu, and Zn, and b, c, d, and e are $0 \leq b \leq 0.2$, $0 \leq c \leq 0.04$, $0.09 \leq d \leq 0.13$, and $0 \leq e \leq 1.5$, respectively.

2. The magnetic cooling device of claim 1,
   wherein a particle size of the magnetic material particles is 100 μm or more and 3000 μm or less.

3. The magnetic cooling device of claim 1,
   wherein the magnetic material is an alloy represented by $Gd_{1-a}Y_a$, where $0 \leq a \leq 0.05$.

4. The magnetic cooling device of claim 1,
   wherein the inert gas has an oxygen content of 10 vol % or less.

5. The magnetic cooling device of claim 1,
   wherein the inert gas is selected from the group consisting of a nitrogen gas, an argon gas, or a mixed gas of nitrogen and argon.

6. The magnetic cooling device of claim 1,
   wherein the volume proportion of the inert gas in the hollow container is 6 vol % or more and 10 vol % or less.

7. The magnetic cooling device of claim 1,
   wherein the material partition has a mesh structure in which a size of an opening is smaller than a particle size of the magnetic material particles.

8. The magnetic cooling device of claim 1,
   wherein a volume proportion of the gas storages in the hollow container is 10 vol % or more and 50 vol % or less.

9. A magnetic cooling apparatus comprising the magnetic cooling device of claim 1.

10. A magnetic cooling method using a magnetic cooling apparatus provided with a magnetic cooling device, the magnetic cooling device including: in a hollow container, an inert gas; a material filling part containing a refrigerant and magnetic material particles having a magnetocaloric effect; gas storages containing the refrigerant at both ends of the material filling part; and material partitions between the material filling part and the gas storages, wherein
   a particle size d (μm) of the magnetic material particles is 100 μm or more and 3000 μm or less,
   a flow velocity v (mm/s) in a magnetic cooling cycle of the refrigerant is 20 mm/s or more and 80 mm/s or less,
   a volume proportion x (vol %) of the inert gas in the hollow container is 1 vol % or more and 12 vol % or less, and:
   $x \leq 2.1\ v^2/d$ and $1 \leq x \leq 12$ is satisfied.

* * * * *